United States Patent [19]
Watson et al.

[11] Patent Number: 6,009,440
[45] Date of Patent: Dec. 28, 1999

[54] METHOD AND SYSTEM FOR AUTOMATIC OBJECT REFRESH

[75] Inventors: Kevin K. Watson; William J. Johnson, both of Flower Mound, Tex.

[73] Assignee: MCI Communications Corporation, Washington, D.C.

[21] Appl. No.: 08/934,164

[22] Filed: Sep. 19, 1997

[51] Int. Cl.⁶ .................................................. G06F 17/30
[52] U.S. Cl. ........................ 707/203; 707/200; 707/201; 707/202
[58] Field of Search .................................. 707/1–10, 100, 707/200–204; 705/28; 702/182; 710/200, 39; 712/1; 713/323, 200; 345/339, 340, 344, 352, 511; 364/238.3; 395/676, 682, 500, 709, 712, 230; 709/230; 380/4, 24

[56] References Cited

U.S. PATENT DOCUMENTS

| | | | |
|---|---|---|---|
| 4,558,413 | 12/1985 | Schmidt | 707/203 |
| 4,646,261 | 2/1987 | Ng | 345/526 |
| 5,280,612 | 1/1994 | Lorie | 707/1 |
| 5,410,697 | 4/1995 | Baird | 395/650 |
| 5,515,493 | 5/1996 | Boston | 345/344 |
| 5,613,117 | 3/1997 | Davidson | 345/708 |
| 5,748,930 | 5/1998 | Prakash | 705/28 |
| 5,812,130 | 9/1998 | Van Huben | 345/339 |
| 5,854,932 | 12/1998 | Mariani | 395/709 |

*Primary Examiner*—Thomas G. Black
*Assistant Examiner*—Diane D. Mizrahi

[57] ABSTRACT

A method and system for automatic object refresh. A target object specification is associated to a source object specification for performing a replacement (refresh) of at least one target object with a corresponding source object. When a target object is accessed for the first time, or released from a last access, one or more source objects may replace (refresh) the locations of one or more corresponding target objects. A comparison of values of an identical attribute may be performed, such as a date/time stamp, or trap count, of corresponding source and target objects. The refresh may be conditional depending on the outcome of the comparison. The conditional refresh is: an automatic replacement of at least one of the objects of the target object specification with a corresponding object of the source object specification, an automatic asynchronous notification that a more current or suitable object exists and option for automatic refresh therefrom, or an automatic replacement of at least one of the objects of the target object specification with a corresponding object of likely better stability. The source object specification and target object specification may be specified with wildcards, map files, or environment variables. The source objects and target objects may be located locally, or remotely, to the data processing system that accesses the objects.

18 Claims, 6 Drawing Sheets

METHOD AND SYSTEM FOR AUTOMATIC OBJECT REFRESH

TECHNICAL FIELD OF THE INVENTION

The present invention relates in general to data processing systems, and in particular, to a method and system for automatic object refresh. Still more particularly, the present invention relates to a method and system for automatically maintaining on a data processing system the most current and stable object, for example, executable processing code and/or data files.

BACKGROUND OF THE INVENTION

A software product typically goes through many iterations of development releases, usually in parallel with problem fixes, functionality upgrades, performance improvements, etc. In a dynamic environment where it is important to take advantage of application functions as they become available, for example, for test or use purposes, a user is burdened with figuring out when to refresh executable code for the most current release. A user seeks status for when a later revision of executable code is available. Then the later version may be installed, or the files of importance from the development build must be copied to the correct location. There are many manual steps in this refresh process. A method is needed for automatically performing object code refreshes as soon as is appropriate, without user intervention, to assure the latest greatest level of software at all times.

A user may experience difficulty with later revisions of developed software. It becomes advantageous to backout the system to the previous and more stable level of software. Upon determining that the current product build warrants refreshing object code with a previous version, there are manual processes involved with performing the backout. Different users may also have different tolerances of when to backout. In such situations, an automated method is needed for consistently determining when backout is required, and then backing out a software refresh to a more stable level.

SUMMARY OF THE INVENTION

The present invention provides automatic validation for whether executable processing is most current, and if not, the most current processing is automatically loaded. A tolerance of run time errors is additionally configurable for triggering when and how to backout processing to a more stable level. A stable executable can be automatically re-loaded when the tolerance of errors is exceeded. Further configuration provides asynchronous notification to a user when a later level of processing is available. The notification itself may be used as a single reminder, a continual reminder, or as the prompt mechanism to automatically perform the refresh. While executable objects are of particular importance, any object of a data processing system, for example a data file, can be automatically refreshed with use of the present invention.

Executable objects (e.g. software files) and/or data objects (e.g. data files) are refreshed at opportune moments such as when a file is newly accessed, when the last access of a file has completed, or upon user acknowledgement to perform the refresh action.

Configurations include specifying dependency relationships, such as a single object (e.g. file) dependent on an other single object, a single object dependent on a set of objects, a set of objects dependent on a single object, and a set of objects dependent on a set of objects. Configurations are performed with two object specifications; a target object specification, and a source object specification.

In a preferred embodiment, the source object specification indicates to the present invention where to retrieve one or more files, and the target object specification indicates to the present invention where to refresh (i.e. replace) one or more files. The number of files of the source object specification will always equal the number of files of the target object specification when evaluating a particular configuration. A single file in a set, or an entire set of files, may be refreshed according to the configuration.

In the preferred embodiment, an attribute of a file such as the date/time stamp, or number of detected executable errors during use (i.e. for executable files such as .EXE or .DLL in the WIN/3.x, WIN/95, WIN/NT, or OS/2 operating systems) is used for determining when to perform the automatic refresh. (WIN/3.x, WIN/95, and WIN/NT are trademarks of Microsoft Corporation. OS/2 is a trademark of International Business Machines corporation.)

It is therefore one advantage of the present invention in providing timely automatic executable processing refresh to a data processing system. The data processing system may be present on a personal computer, a mainframe system, a telecommunication switch, a network router or other network system entity, or the like. A refresh can be performed by replacing a local object (e.g. file on data processing system local drive) with a local object, or by replacing a local object with a remote object (e.g. file accessed from remote system via some communications interface and link thereof). A refresh can be performed by replacing a remote object with a local object, or by replacing a remote object with a remote object.

It is an advantage of the present invention in providing automatic user notification (a prompt) of a more current object (e.g. file) when a user desires to be asynchronously notified during the use of applications. For example, an executable in use cannot be instantly refreshed because an operating system "locks" the executable when it is accessed, therefore the present invention notifies the user when an automatic refresh can, or should, be performed. The user may automatically refresh at a convenient time with a simple single mouse click or keyboard keystroke for acknowledging the notification prompt.

It is another advantage of the present invention in performing a refresh at the first opportune moment as well as the most efficient moment. If a file is never accessed, it does little good to refresh it. Also, an object may be accessed simultaneously by many processes (or users). Therefore, files are refreshed when the first of many processes accesses an object, and when the last of many processes completes accessing an object. This scheme works well since operating systems of data processing systems maintain integrity by "locking" files that are in use by one or more users or processes. Another opportune moment incorporated by the present invention is user prompting. A user may respond to a simple asynchronous prompt for performing an automatic refresh.

It is another advantage of the present invention in providing automatic backout of an executable file to a previous version upon automatically detecting a configured error tolerance. The user is appropriately made aware of the backout so as to assure no surprise that a backout is being automatically performed.

It is an advantage of the present invention in providing a fully optional and comprehensive system configuration. Object specifications are flexible and are consistent with other configurations made to data processing systems.

It is a further advantage of the present invention to relieve the user of being concerned with matters of what, when, where, and how to handle object refreshes for situations such as file upgrades (e.g. development build files), file refreshes for testing or use, software stability problems during use, and availability of more current files.

It is yet another advantage of the present invention to relieve the user from the many manual tasks that are typical with matters of what, when, where, and how to handle object refreshes for situations such as file upgrades, file refreshes for testing or use, software stability problems during use, and availability of more current files.

Another advantage of the present invention is to allow object refresh of any object of the data processing system. While executable files are of particular importance, data files such as help files, graphical user interface (GUI) icons, GUI dialogues, editor and desktop application created files, document files, or any object of the data processing system, is also able to be automatically refreshed.

The foregoing objectives are achieved as is now described. A method and system are disclosed for automatic object refresh. The present invention allows automatically maintaining on a data processing system the most current and stable objects.

The above features and advantages of the present invention will become apparent to a person of ordinary skill in the field of the invention in view of the drawings and following detailed written description.

The preferred embodiment of the invention is described below with reference to the figures wherein the leftmost digit of each reference number corresponds to the figure in which the reference number is first used.

DETAILED DESCRIPTION OF THE INVENTION

While specific steps, configurations, and arrangements are discussed, it should be understood that this is done for illustrative purposes only. A person skilled in the relevant art will recognize that other steps, configurations, and arrangements can be used without departing from the spirit and scope of the invention.

Figure 1:
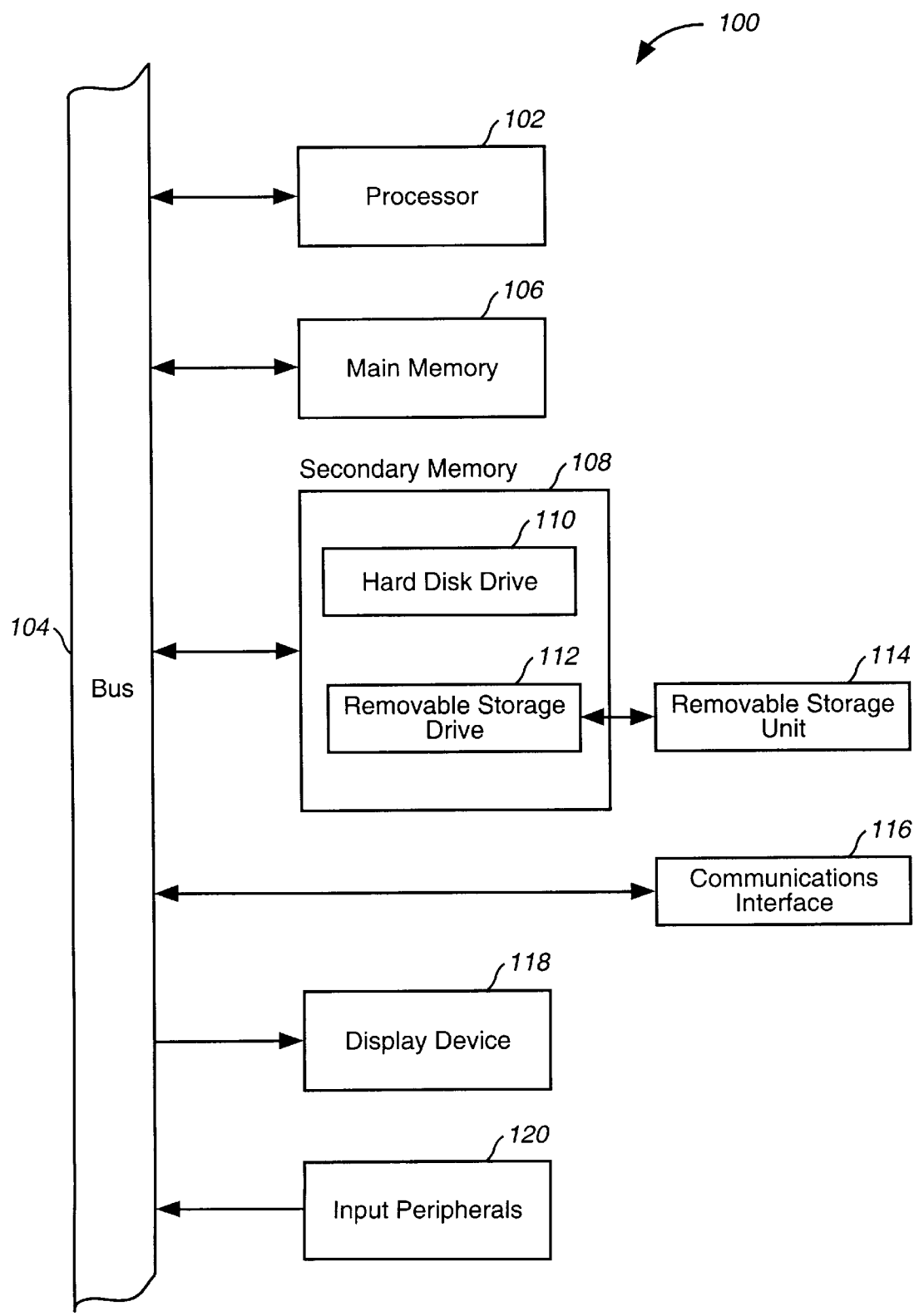
FIG. 1 depicts a data processing system in which the present invention may be utilized.

With reference now to the figures, and in particular with reference to FIG. 1, depicted is a representation of a data processing system 100 which may be utilized to incorporate and implement the method and system of the present invention.

The data processing system 100 includes at least one or more processors, such as processor 102, and a main memory 106, preferably random access memory (RAM). The processor 102 is connected to a communications bus 104 for appropriate interface to other data processing system elements of FIG. 1 hereinafter described.

The data processing system 100 also includes a secondary memory 108. The secondary memory 108 includes, for example, a hard drive 110 and/or a removable storage drive 112 representing a floppy disk drive, a magnetic tape drive, a compact disk drive, a program cartridge and cartridge interface, a removable memory chip (such as EPROM, or PROM), etc. Removable storage unit 114 represents a floppy disk, magnetic tape, compact disk, etc. The removable storage unit 114 may include a data processing system usable storage medium having stored therein data processing software and/or data. The removable storage drive 112 reads from, and/or writes to, a removable storage unit 114 in a well known manner.

The data processing system 100 may also include other similar means for allowing data processing system programs or other instructions to be loaded. Such means can include, for example, a communications interface 116. Communications interface 116 allows software and data to be transferred between data processing system 100 and other data processing systems or external devices. Examples of communications interface 116 include a modem, a local area network (LAN) interface (e.g. Ethernet card), a medium area network (MAN) interface (e.g. Optical Cross Connect fiber interface), a wide area network (WAN) interface (e.g. microwave interface to/from satellite), a communications port (e.g. serial), etc. Software and data (e.g. data files) transferred via communications interface 116 are in the form of signals which can be electronic, electromagnetic, optical, or other signals capable of being received by communications interface 116.

Data processing system software may be stored in main memory 106, or loaded into main memory 106 using removable storage drive 112, hard disk drive 110, or communication interface 116. The software, when executed by the processor 102 causes the processor 102 to perform the functions as commanded by the software. Operating systems such as WIN/3.x, WIN/95, WIN/NT, and OS/2 are examples of system software loaded into main memory 106 for managing the execution of many other software programs. Depending on the hardware and application of data processing 100, there are many varieties of operating systems and of additional data processing system elements beyond a processor 102 and main memory 106. The present invention is software integrated with, or coupled to, operating systems.

The data processing system 100 may also include a display device 118 and one or more input peripherals 120. The display device 118 represents a screen or monitor on which visual data, for example a graphical user interface (GUI), may be displayed. The input peripherals 120 include, for example, a keyboard, a mouse, a light pen, a pressure sensitive screen, etc. which provide a user with the capability of entering input to the data processing system 100.

Those skilled in the art appreciate that the hardware embodiment of data processing system 100 may be a mainframe, a minicomputer, a personal computer, a telecommunications switch, or the like. Peripherals such as printers, scanners, microphones, sound cards, fax machines, monitors, or the like, may further complement the data processing system 100.

Figure 2:
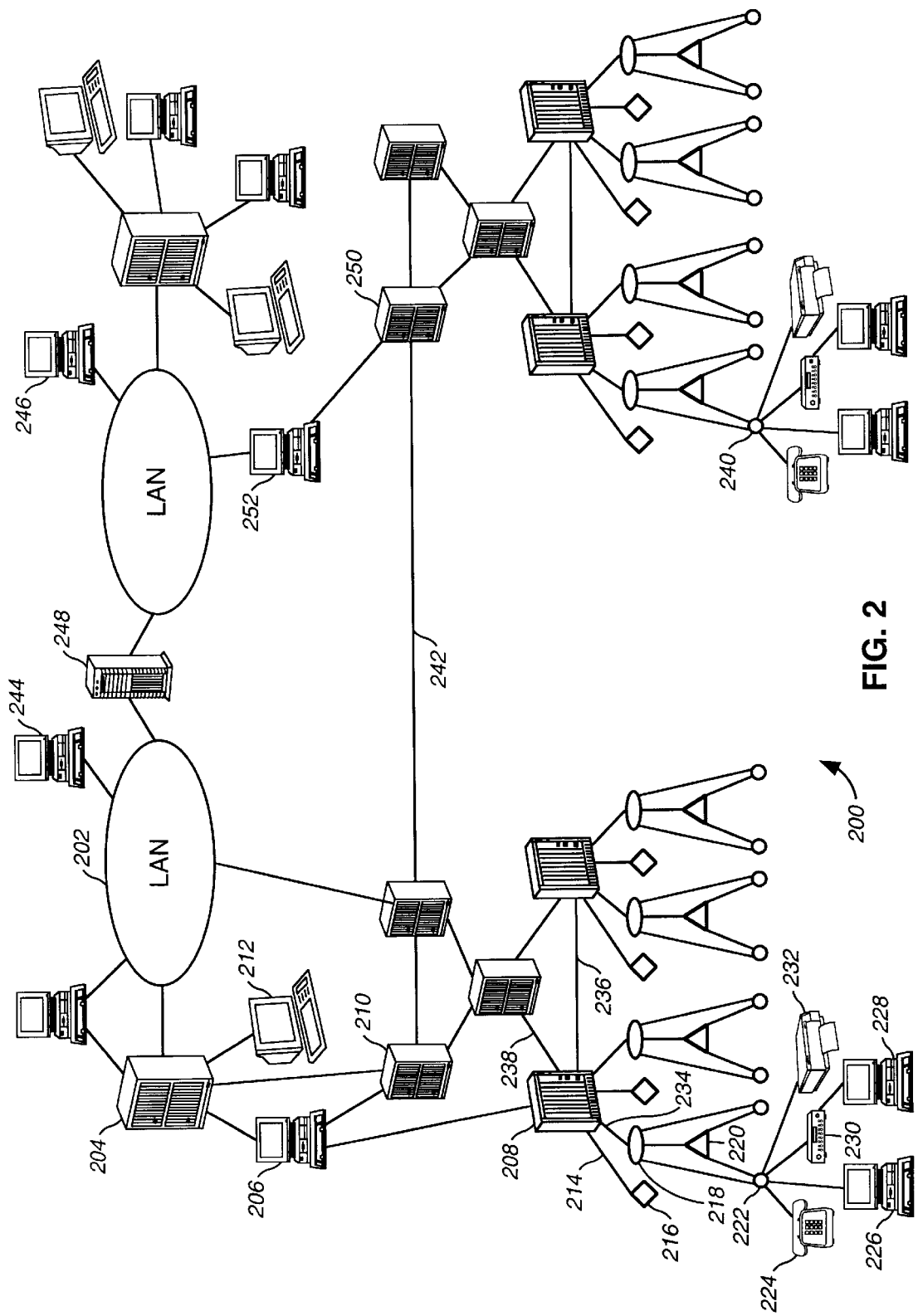
FIG. 2 is a pictorial representation of various environments in which the present invention may be practiced.

With reference now to FIG. 2, depicted is a network topology 200 of various environments in which, or for which, the present invention may be practiced. Same icons and same shapes in the figure represent the same type of system. The network may be integrated with Local Area Networks (LANs) including Local Area Network (LAN) 202, mainframe systems including mainframe 204 with attached dumb terminals (DTs) such as Dumb Terminal (DT) 212, personal computers (PCs) including personal computer (PC) 206, varieties of telecommunications digital cross connect (DXC) switches including class 3 switch 208 and class 1 switch 210, and varieties of other systems often referred to as nodes in the network. Nodes in the network contain a data processing system 100.

The term network, as used herein, refers to a collection of two or more nodes linked together with communications functionality. Any node subset of FIG. 2 including two or more nodes which can communicate with each other is also a network. FIG. 2 may also be a subset of a larger network.

Lines shown between nodes in FIG. 2 demonstrate communications paths, links or spans that are understood to be links between communications interfaces 116 of data processing systems 100 of nodes in the network. For example, a Direct Access Line (DAL) span 214 is at least one trunk between switch 208 and a directly connected customer Private Branch Exchange (PBX) 216. Point of Presence (POP) 218 is connected to a Local Tandem 220 and an End Office 222. The End Office (EO) 222 is the Local Exchange Company (LEC) switching center which provides dial tone and local service to end users who use equipment such as a telephone 224, an internal modem connected PC 226, a PC 228 which is connected with an external modem 230, a fax machine 232, or the like. Spans 234, 236 and 238 include at least a single trunk. An end user of EO 240 is able to communicate with an end user of EO 222 through one or more circuits by way of a link of span 242. EO 240 and EO 222 may be great distances from each other. Spans 242, 236 and 238 could be accomplished with microwave via a satellite, or optical fiber. A user of a data processing system connected to EO 240 may access or retrieve various objects, for example files, from a data processing system connected to EO 222. Use of the internet is a good example of where objects are shared between users of many different types of systems.

A network is typically interconnected with varieties of data processing systems 100 including PC 206, mainframe 204, switch 208, etc. These systems may be interconnected with LAN cables, telephone wires, optical fiber, wireless radio waves, or the like. Many varieties of protocols are available to facilitate communications over these mediums. PC 206 may be enabled for direct communications with a host 204, a switch 208, a switch 210, a DT 212 through host 204, a LAN connected PC 244, a remote LAN PC 246 by way of a server bridge 248, or a switch 250 by way of a gateway server PC 252. In fact, users at any system of FIG. 2 may communicate with users at any other system in FIG. 2 by way of a communications path methodology well known to those skilled in the art.

It should be understood that objects of some data processing systems are easily copied or moved to other data processing systems by well known communications methods. Thus, objects accessed may be locally or remotely located to the data processing system 100 which accesses the particular object via some communications interface 116.

Turning now to the flowcharts of FIG. 3 through FIG. 6, processing for the present invention is shown. So as to not obfuscate more important details, certain obvious processes, such as obvious error handling, has been omitted in the flowcharts.

Figure 3:
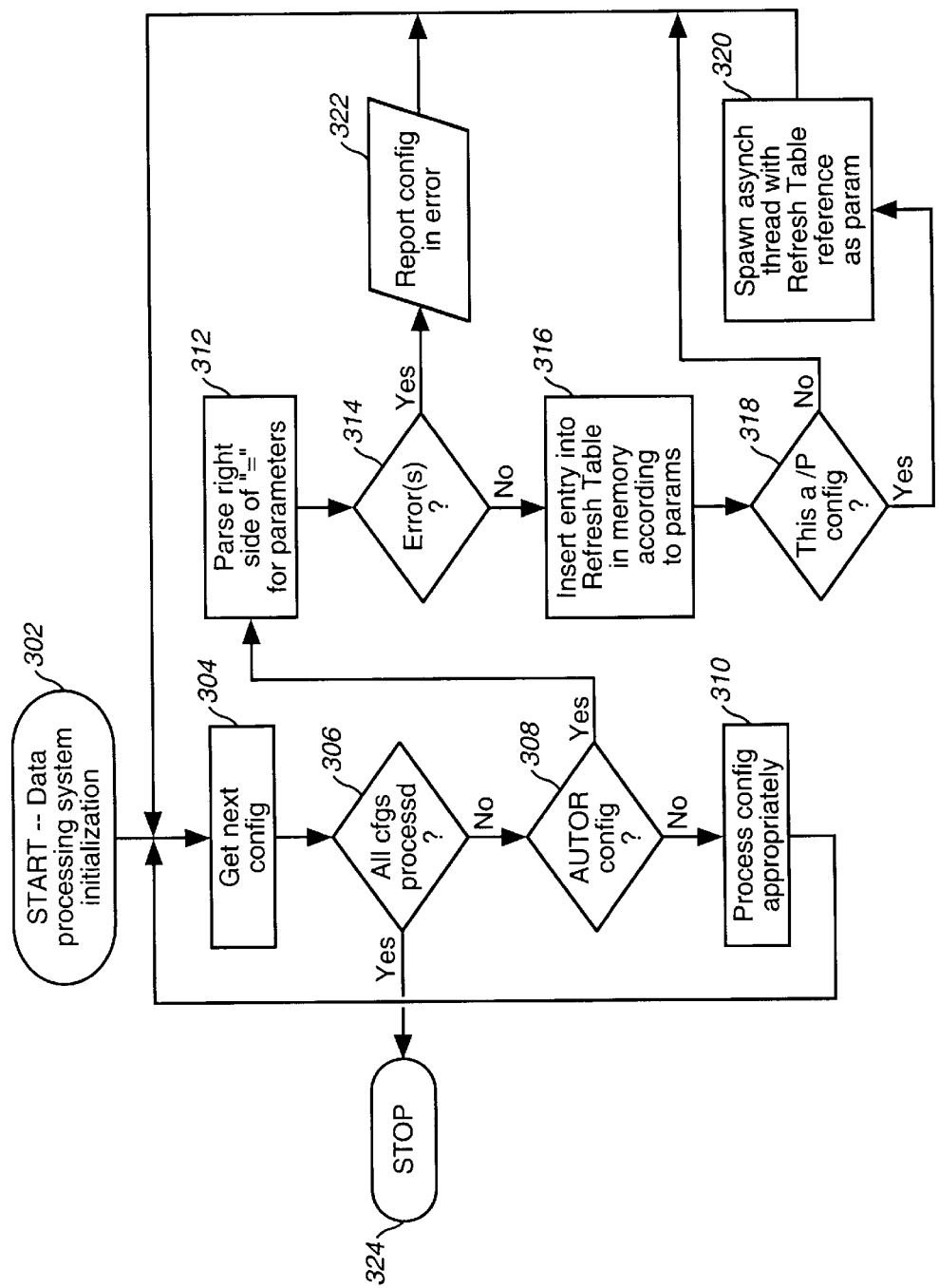
FIG. 3 is a flowchart depicting the data processing system startup aspect of the present invention.

With reference to FIG. 3, a flowchart depicting the data processing system startup aspect of the present invention is described. In the preferred embodiment, for example for windowed operating systems such as WIN/3.x, WIN/95, WIN/NT, or OS/2, configuration of the present invention comprises entries in the CONFIG.SYS configuration file. In other embodiments, such as another operating system, a telecommunication switch, a network router, or any other data processing system 100, a similar file that is interrogated at system startup is suitable.

In the preferred windowed operating system embodiments, entries are placed in the CONFIG.SYS file according to the following syntax as is customary for describing DOS (Disk Operating System) commands and CONFIG.SYS commands. The bracketed options are optional.

---

AUTOR=target_file_spec source_file_spec
[/S] [/C | /U | /T:n] [/P:p,t]

| | |
|---|---|
| AUTOR | indicates this is an AUTOmatic Refresh |
| target_file_spec | configuration; is the target object specification (objects can be local or remote to the referencing data processing system). Objects specified form an ordered set of one or more objects; |
| source_file_spec | is the source object specification (objects can be local or remote to the referencing data processing system). Objects specified form an ordered set of one or more objects; |
| /S | indicates to refresh all files of the target_file_spec if any one file should be refreshed. Absence of the /S parameter (the default) indicates to only update the file(s) which are out of date; |
| /C | indicates to perform a conditional refresh (this is the default if /C, /U, or /T:n not specified). /C, /U, /T are mutually exclusive specifications; |
| /U | indicates to perform an unconditional refresh; |
| /T:n | indicates that a tolerance of n trap errors is permitted on the file(s) before the file(s) are to be backed out to previous version(s) (i.e. backout to source_file_spec). A user acknowledgement pop-up window is presented to the user for confirmation; |
| /P:p,t | indicates that an asynchronous prompt should be provided as soon as a later date/time is detected for file(s) of the target_file_spec when compared to the source_file_spec. The prompt will continually be presented to the user (if pop-up window not still present on system user interface) every t minutes until the user requests automatic refresh or to not continue reminding. The system will asynchronously poll the source_file_spec every p minutes to determine if a more recently updated file is available. The pop-up window has 4 options for user acknowledgement: NO MORE NOTIFY FOR OBJECT(S), KEEP NOTIFYING FOR OBJECT(S), PERFORM AUTOMATIC REFRESH NOW AND KEEP MONITORING FOR UPDATES, or PERFORM AUTOMATIC REFRESH NOW AND STOP MONITORING FOR UPDATES. The default is no /P option. /P and /T are mutually exclusive options. |

---

Target_file_spec and source_file_spec can take on one of three forms:

Explicit or Wildcard specification

Use an explicit file path to reference a single file, and a wildcard file path to reference a set of source or target files: C:\DIR1\DIR2\FN*.*,C:PROD1\*.DLL. Note that multiple wildcard file paths can be specified with intervening commas to expand the single target_file_spec or source_file_spec. Alternatively, back to back explicit file paths can be used to form the entire target_file_spec or source_file_spec. One or more space characters separate target_file_spec from source_file_spec.

MAP specification

Use map files to reference source or target files: /MD:\MAPS\PROD1.MAP. The MAP file is a flat ASCII file containing Explicit or wildcard specifications as described above, separated by <CR><LF> (Carriage Return, Line Feed). That is, one specification per line in the map file. This allows convenient management of source and target object specifications to the present invention. The string up to the first blank after the /M is used for the explicit map file path. A map specification may be local or remote according to the map file path.

Environment Variables

Use environment variables to reference source or target files:

ENV_NAME=$fs_1, fs_2, \ldots, fs_n$
%ENV_NAME%=$fs_{n+1}, fs_{n+2}, \ldots, fs_{n+k}$ All standard environment variable rules apply as well known to those skilled in the art. Each $fs_i$ (file specification i) is an Explicit or wildcard specification as described above, separated by commas. The environment variable is similar to PATH, LIBPATH, DPATH, or any other environment variable of CONFIG.SYS or AUTOEXEC.BAT. The name used on the left hand side may be specified for target_file_spec or source_file_spec. The only requirement is that if an environment variable form is used, the environment variable must appear before the AUTOR line that references it.

EXAMPLES

AUTOR=C:\office\mail\IPCOMM.DLL Z:\BACKOUT\IPCOMM.DLL /T:3
AUTOR=C:\office\mail\IPCOMM.DLL Z:\LIB\IPCOMM.DLL /P:30,5

Configurations may be made to complement each other. Here a backout is configured protecting against instability while monitoring for a later release. In the first configuration, the /T option indicates to the system that an executable trap attribute be maintained for the target_file_spec. If any type of run time error trap is detected more than three times within the IPCOMM.DLL in C:\office\mail, then the IPCOMM.DLL (assumed to be trap attribute of 0) in Z:\BACKOUT will replace it automatically. In the second configuration, because /C is the default, this configuration indicates to replace IPCOMM.DLL in C:\office\mail with IPCOMM.DLL accessed via the LAN from Z:\LIB whenever the file date/time stamp attribute on Z: is later than the file on C:. The file specifications do not have to be the same name. The /P option indicates to the system to poll the source_file_spec every 30 minutes for comparing the attribute date/time stamp to the corresponding target, and that the user should be notified every 5 minutes with a notification prompt to perform a refresh if the user acknowledges the previous prompt (same notification) for do another remind without confirming the refresh at that time.

AUTOR=/C /MD:\maps\mymap.dat /MQ:\docs\m\buildm.dat /S

Because /C is specified, this configuration indicates to replace target_file_spec with source_file_spec whenever the file date/time stamp attribute on source_file_spec is later than target_file_spec. By default (i.e. no /S option), any single file determined to be out of date in the map of target_file_spec will be automatically replaced with the corresponding file of source_file_spec. Therefore by default, files are managed on an individual basis from the potentially large set of files. The presence of the /S option indicates to the system that if any single file of target_file_spec is out of date with respect to the corresponding file of source_file_spec, then the entire set of files described by source_file_spec will refresh the corresponding set of files of target_file_spec. A map specification is used for both parameters.

AUTOR=/U MYOBJS LANOBJS

Because the /U option is specified, this configuration indicates to unconditionally refresh all files of target_file_spec with corresponding files of source_file_spec immediately at the first access (or last release of access) of any files in target_file_spec. Note that both spec operands utilize environment variables which must be defined prior to reference in the AUTOR command.

AUTOR=d:\offic\*.dll,d:\offic\exe\main.exe, d:\offic\exe\util.exe THEOBJS /P:15,5

Because /C is the default, this configuration indicates to replace all files elaborated from the target_file_spec with the source-file-spec whenever the file date/time stamp attribute indicates to do so. The target_file_spec in this example is formed by creating an ordered set of files paths (concatenating a list from the three counterparts) in turn (for example, d:\offic\a.dll, d:\offic\b.dll, d:\offic\c.dll, d:\offic\e.dll, d:\offic\exe\main.exe, d:\office\exe\util.exe, ordered respectively). THEOBJS is an environment variable wherein the file order thereof corresponds to the target_file_spec. The IP option indicates to the system to poll the source_file_spec every 15 minutes for comparing the attribute date/time stamp to the corresponding target, and that the user should be notified every 5 minutes with a notification prompt to perform a refresh if the user acknowledges the previous prompt (same notification) for do another remind without confirming the refresh at that time.

Any of the three forms of the source_file_spec or target_file_spec can be used at any time with mixing and matching types of uses in a single AUTOR configuration. The least number of files in either specification is used to dictate which files correspond to each other. If the source_file_spec references 25 file paths (e.g. by explicit, wildcarding, map file or environment variable) and the target_file_spec references 10 file paths, then the first 10 files from source file spec will be matched to (correspond to) the 10 file paths of target_file_spec. Likewise, if the source_file_spec references 12 file paths and the target_file_spec references 15 file paths, then the first 12 files from target_file_spec will be matched to (correspond to) the 12 file paths of source_file_spec. The order of referenced files is critical for correctly matching a source file with a target file. Wildcards must be used carefully. Ascending alphanumeric order is used when determining how files will be elaborated to a wildcard before matching a file from either specification for comparison. Alternative embodiments may assume descending order or other ordering logic. Thus, a target object specification and a source object specification is an ordered set of objects.

Assuming configurations have been made as appropriate to a particular data processing system 100, the data processing system initialization begins at block 302 and continues to block 304.

Block 304 retrieves configurations one at a time. The first encounter of block 304 retrieves the first configuration and then processing continues to decision block 306. If at decision block 306, it is detected that all configurations have not yet been processed, then decision block 308 checks for an AUTOR configuration as described above. If decision block 308 determines the configuration from block 304 is not an AUTOR configuration, then block 310 processes the configuration in the customary manner and processing continues back to block 304.

If at decision block 308, an AUTOR configuration is determined, then block 312 parses and deciphers the right hand side of the "=" character and block 314 checks for errors. If decision block 314 determines there are no errors, then block 316 inserts an entry into a Refresh Table according to the parse performed at block 312. Thereafter, decision block 318 checks the type of configuration. If at decision block 318 the AUTOR configuration is a /P configuration as described above, then block 320 spawns an asynchronous thread of processing (described below in FIG. 6) with a parameter for the Refresh Table entry reference, for example a pointer. Processing thereafter returns to block 304.

If at decision block 318 it is determined that the currently processed AUTOR configuration is not a /P configuration, then processing continues directly back to block 304.

If at decision block 314 it is determined that there are one or more syntactical errors, then processing continues to block 322 for proper reports of error and then back to block 304. Errors include invalid syntax, invalid environment variable, etc.

If at decision block 306 all configurations are processed, then data processing initialization of the present invention terminates at block 324.

The Refresh Table is maintained in main memory 106 and contains an entry for each AUTOR configuration. /T configurations have the # traps variable initialized to 0. Each entry contains:

| | |
|---|---|
| Target object specification (e.g. files), | |
| Source object specification (e.g. files), | |
| Set Parameter | (/S specified or not), |
| Configuration type | (/C conditional or /U unconditional or /T trap), |
| Prompt Parameter | (/P specified or not), |
| Value n or p | (n if a /T, p if a /P (/T & /P mutually exclusive)), |
| # traps so far or t | (# if a /T, t if a /P (/T & /P mutually exclusive)). |

An entry is preferably encoded in a record structure in a suitable manner well known to those skilled in the art. In the preferred embodiment, no elaboration is performed on the target object specification or the source object specification. The specifications as parsed are stored in the Refresh Table for later elaboration to the ordered set of fully qualified file path names. Validation of drives, map files, directories, wildcards, path names, etc is not validated because there may be processes that must occur after system initialization to make them valid, for example LAN drive access, modem initialization, communications adapter initialization, etc. There will be an equivalent number of source and target object members after elaboration in the respective ordered sets when determining a corresponding source object to an accessed target object.

Figure 4:
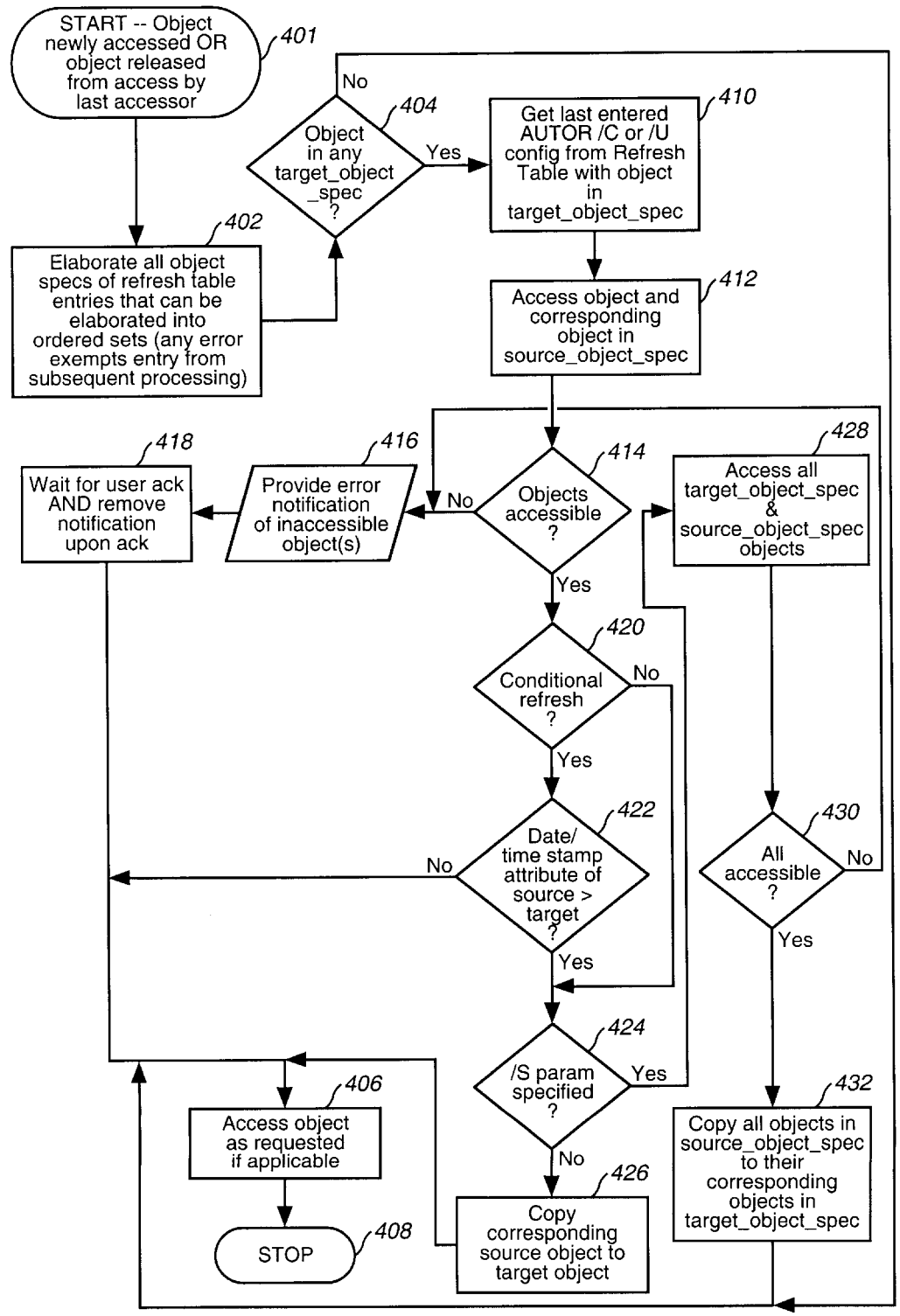
FIG. 4 is a flowchart depicting the object access aspect of the present invention.

With reference now to FIG. 4, the object access aspect of the present invention is described. Processing starts at block 401. Whenever the operating system of the data processing system detects an object such as a file to be newly accessed, or to be released from access by the last process (or user) to access the object, then block 401 is invoked. An object such as a file may be accessed simultaneously by many processes (or users) so that block 401 is invoked when the first of many processes accesses an object, and when the last of many processes completes accessing an object. Block 401 continues to block 402 wherein the source object specification and target object specification of all entries of the Refresh Table is elaborated to an ordered set of explicit objects, for example, explicit fully qualified file path names. Local and remote accesses are handled appropriately. Any failures for an entry, such as inaccessible drive, invalid file name, etc, make the entry exempt from subsequent processing of FIG. 4. Then, block 402 continues to decision block 404.

Alternatively, block 401 of FIG. 4 could be invoked for all object accesses of a data processing system, in which case, block 401 would continue to a decision block 401A for determining if this is a first access or a last release from access. The block 401A would continue to block 402 if it is determined that a first process is accessing the object, or a last of any processes is completed accessing the object. Otherwise, decision block 401A would continue to block 406 which is discussed below.

In any case, decision block 404 determines if the particular object is configured in any target object specification of conditional or unconditional entries of the Refresh Table (only the Refresh Table entries that could be completely elaborated participate). If not, then processing continues to block 406. Block 406 allows access to the system object as is customary at this point. Block 406 does nothing if the particular object is being released from access. Block 406 then continues to block 408 which terminates FIG. 4 processing.

If at decision block 404 it is determined that the particular object is referenced in a target object specification of elaborated configurations, then block 410 retrieves the last entry in the Refresh Table (conditional and unconditional entries) that contains the object in the target object specification. The order of entries in the Refresh Table is the same as the order of configurations processed by FIG. 3. Thereafter, block 412 accesses the target object (object which causes invocation of block 401) and the corresponding source object from the source object specification of the entry determined by block 410, and block 414 checks for accessibility of those objects. A source object corresponds to a target object of a Refresh Table entry if the member index into the elaborated source object ordered set is equivalent to the member index into the elaborated target object ordered set. The first members of each elaborated ordered set correspond to each other, the second members of each elaborated ordered set correspond to each other, and so on.

If at decision block 414 either of the objects is not accessible, for example, a LAN drive is not accessible, then block 416 provides an error to the user of the data processing system. For example in the windowed operating systems, a pop window containing information useful to the user is presented to the user and an enter key or mouse click would be required to remove the pop-up window to assure the user acknowledges the situation. Block 416 continues to block 418 where the user acknowledgment of the notification presented in block 416 is waited for. Block 418 will remove the notification upon detection of user acknowledgement, for example an enter key or mouse click to the pop-up window. After removal of the notification, processing continues to block 406 which was discussed above.

If at decision block 414 both of the objects are accessible, then processing continues to decision block 420. If at decision block 420 the configuration from block 410 is a conditional configuration (i.e. /C), then processing continues to decision block 422. If at decision block 422 the date/time stamp of the source object is not later than the date/time stamp of the target object, then processing continues to block 406 which was described above.

If at decision block 422 the date/time stamp of the source object is later than the date/time stamp of the target object, then processing continues to decision block 424. Processing also continues to decision block 424 from decision block 420 if decision block 420 determines the configuration is an unconditional refresh.

If decision block 424 determines that the configuration from block 410 indicates the set parameter (/S) was not specified, then block 426 copies only the corresponding source object to the location indicated by the target object (i.e. target object is particular object that caused invocation of block 401). The system is now refreshed. Thereafter, processing continues to block 406 which was described above.

If decision block 424 determines that the set parameter (/S) was specified, then block 428 checks accessibility of all objects in the elaborated source object specification ordered set and the elaborated target object specification ordered set of the Refresh Table entry determined at block 410. Thereafter, if decision block 430 determines that any one object of either ordered sets is not accessible, then processing continues to block 416 which was described above.

If decision block 430 determines that all source and target objects are accessible, then block 432 copies all source objects to their corresponding target objects. The system is now refreshed. Processing then continues to block 406 which was described.

Alternatively at blocks 426 and 432, a prompt containing refresh information could be provided to the user for notification of a pending refresh, and the user could abort or accept the refresh from the prompt.

Figure 5:
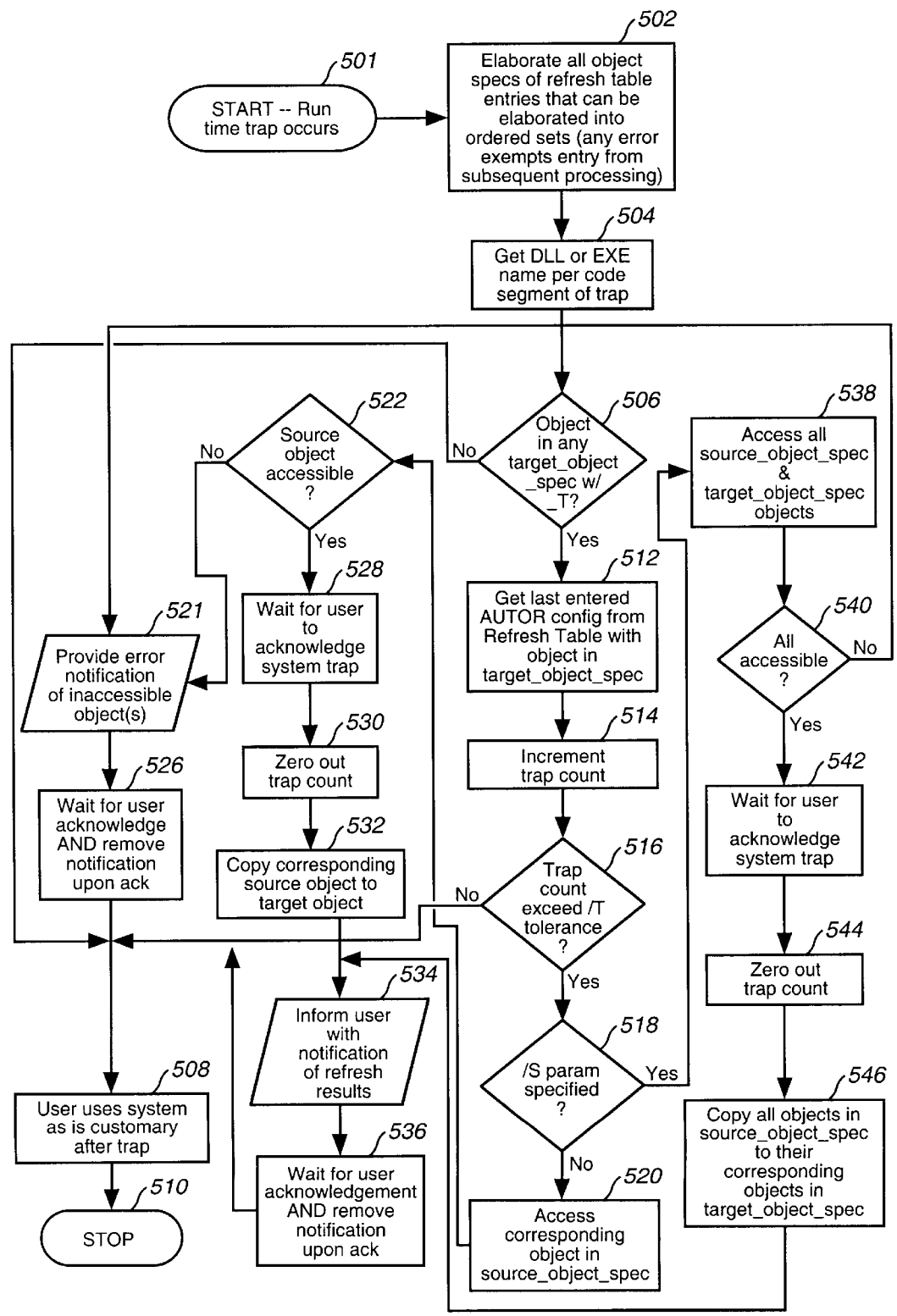
FIG. 5 is a flowchart depicting the trap error aspect of the present invention.

With reference now to FIG. 5, the trap error aspect of the present invention is described. Whenever the operating system of the data processing system detects a run time trap error, block 501 of FIG. 5 is invoked. A trap is when an operating system detects an illegal machine instruction of a software program code segment and then terminates the process of the program with some diagnostic information, thus the term trap. A system trap is well known to those skilled in the art. While compilation and linkage of developed software provides means for identifying most programmatic errors, logical errors that are difficult to be detected without actually executing the software are detectable at run time (i.e. execution time). An operating system will perform a trap for conditions such as when an instruction attempts to access a memory address out of allowable range, an instruction attempts to store data at a memory address out of allowable range, an instruction attempts to perform an illegal arithmetic operation (e.g. divide by 0), or any other illegal execution within the operating system. The trap will produce a notification with diagnostics and will block all user interface activity until a user acknowledges the trap. Thus, block 501 is invoked for such detection.

Block 501 continues to block 502 wherein the source object specification and target object specification of all entries of the Refresh Table is elaborated to an ordered set of explicit objects, for example, explicit fully qualified file path names. Local and remote accesses are handled appropriately. Any failures for an entry, such as inaccessible drive, invalid file name, etc, make the entry exempt from subsequent processing of FIG. 5.

Then, block 502 continues to block 504 where the name of the executable Dynamic Link Library (DLL) or executable main program (EXE) is determined from customary diagnostics provided with trap information. For example, the resulting name from block 504 is a file name with a ".DLL" or ".EXE" extension. Thereafter, block 504 continues to decision block 506.

Decision block 506 determines if the particular object (e.g. executable file name from block 504) is configured in any target object specification of trap (/T) configuration entries of the Refresh Table (only the Refresh Table entries that could be completely elaborated participate). If not, then processing continues to block 508. Block 508 allows the user to handle the trap as is customary, for example, acknowledging the trap, and then perhaps taking action to resolve it. Block 508 then continues to block 510 which terminates FIG. 5 processing.

If at decision block 506 it is determined that the particular object is referenced in a target object specification of elaborated configurations, then block 512 retrieves the last entry in the Refresh Table (trap entries) that contains the object in the target object specification. The order of entries in the Refresh Table is the same as the order of configurations processed by FIG. 3. Thereafter, block 514 increments by 1 the number of traps detected for the configuration containing the target object. Thereafter, decision block 516 checks to see if the configured toleration of traps is exceeded.

If at decision block 516 the tolerance of traps that was configured is not exceeded, then processing continues to block 508 which was described above. If decision block 516 determines that the tolerance was exceeded, then decision block 518 checks to see if the set parameter (/S) was specified.

If decision block 518 determines that the configuration from block 512 indicates the set parameter (/S) was not specified, then block 520 attempts access to the corresponding object in the source object specification ordered set of the Refresh Table entry from block 512.

Thereafter, if at decision block 522 the corresponding source object is not accessible, for example, a LAN drive is not accessible, then block 524 provides an error to the user of the data processing system. For example in the windowed operating systems, a pop window containing information useful to the user is presented to the user and an enter key or mouse click would be required to remove the pop-up window to assure the user acknowledges the situation. Block 524 continues to block 526 where the user acknowledgment of the notification presented in block 524 is waited for. Block 526 will remove the notification upon detection of user acknowledgement, for example an enter key or mouse click to the pop-up window. After removal of the notification, processing continues to block 508 which was discussed above.

If at decision block 522 the corresponding source object is accessible, then processing continues to block 528 where the system waits for the user to acknowledge the trap. System traps require intervention by a user for acknowledging the trap. Otherwise, the system is unusable until the trap screen is acknowledged. Upon user trap acknowledgement, block 530 re-initializes the # traps variable in the Refresh Table entry to 0 and then block 532 copies the corresponding source object to the target object which caused the system trap.

Thereafter, block 534 provides a notification to the user of the data processing system of the refresh results. For example in the windowed operating systems, a pop window containing information useful to the user is presented to the user and an enter key or mouse click would be required to remove the pop-up window to assure the user acknowledges that a refresh occurred. Block 534 continues to block 536 where the user acknowledgment of the notification presented in block 534 is waited for. Block 536 will remove the notification upon detection of user acknowledgement, for example an enter key or mouse click to the pop-up window. After removal of the notification, processing continues to block 508 which was discussed above.

If at decision block 518 the set parameter (/S) was specified, then processing continues to block 538 which checks accessibility of all objects in the source object specification and the target object specification of the Refresh Table entry determined at block 512. Thereafter, if decision block 540 determines that any one object of either elaborated ordered sets is not accessible, then processing continues to block 524 which was described above.

If decision block 540 determines that all source and target objects are accessible, then processing continues to block 542 where the system waits for the user to acknowledge the trap. Upon user trap acknowledgement, block 544 re-initializes the # traps variable in the Refresh Table entry to 0 and then block 546 copies all source objects of the configuration to the corresponding target objects. Block 546 then continues to block 534 which was described.

Alternatively at blocks 532 and 546, a prompt containing refresh information could be provided to the user for notification of a pending refresh, and the user could abort or accept the refresh from the prompt.

Figure 6:
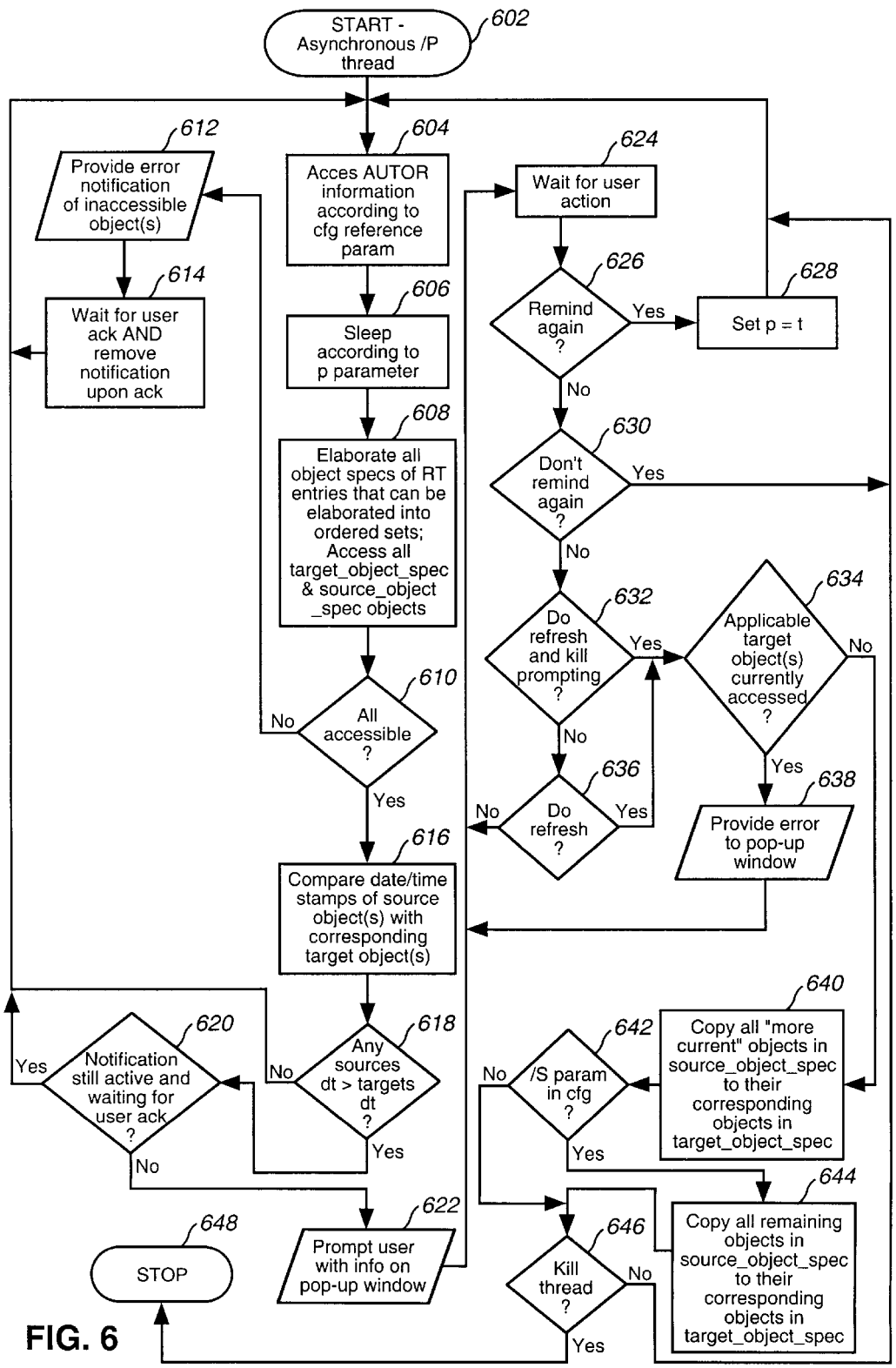
FIG. 6 is a flowchart depicting the asynchronous prompt aspect of the present invention.

With reference now to FIG. 6, there is a flowchart depicting the asynchronous prompt aspect of the present invention. There may be many instances of FIG. 6 spawned to a data processing system at any particular time, depending on the configurations and use of a data processing system at any time. It is advantageous to prevent an excessive number of prompt (/P) configurations as to not degrade system performance with too many prompt threads. Of course, an alternative embodiment within the scope and spirit of the invention is to have a main supervisory thread responsible for scheduling all prompts, and coordinating processing thereof.

Block 602 is invoked as the result of being a spawned asynchronous thread of execution from block 320 of FIG. 3. Block 602 continues to block 604 where the Refresh Table reference parameter is used to access the correct Refresh Table configuration entry. Thereafter, block 606 sleeps according to the poll time p parameter.

Upon elapsed time according to the p parameter, processing continues to block 608 wherein the source object specification and target object specification of all entries of the Refresh Table is elaborated to an ordered set of explicit objects, for example, explicit fully qualified file path names. Local and remote accesses are handled appropriately. Any failures for an entry, such as inaccessible drive, invalid file name, etc, make the entry exempt from subsequent processing of FIG. 6. Block 608 also accesses the objects of both the target object specification ordered set and the source object specification ordered set, and then decision block 610 checks for accessibility of all the objects. If any one of the elaborated objects is not accessible, then block 612 provides an error to the user of the data processing system. For example in the windowed operating systems, a pop window containing information useful to the user is presented to the user and an enter key or mouse click would be required to remove the pop-up window to assure the user acknowledges the situation. Block 612 continues to block 614 where the user acknowledgment of the notification presented in block 612 is waited for. Block 614 will remove the notification upon detection of user acknowledgement, for example an enter key or mouse click to the pop-up window. After removal of the notification, processing continues back to block 604 which was discussed above.

If decision block 610 determines all the objects are accessible, then block 616 compares the date/time stamps of source objects with their corresponding target objects. Thereafter, decision block 618 checks comparison results.

If at decision block 618, no source objects have later date/time stamps when compared to their corresponding target objects, then processing continues back to block 604.

Otherwise, decision block 618 continues to block 620. If at decision block 620, it is determined that a prompt for this Refresh Table entry is active and has not yet been acknowledged, then processing continues back to block 604. If there is no active prompt for user action awaiting acknowledgment as determined by decision block 620 then block 622 provides the prompt for user action, for example a pop-up window containing relevant information and options for four actions.

Thereafter, block 624 awaits the user action. Exit from block 624 can only be for one of four actions performed as determined by decision blocks 626, 630, 632, and 636: abort the refresh and provide another reminder, abort the refresh, perform the refresh and kill the prompting thread, perform the refresh and keep prompt thread processing, respectively. Assuming the user has responded to the prompt of block 622, decision block 626 determines if the user acknowledged the notification with abort the pending refresh and provide another reminder. If decision block 626 determines that another reminder is desired, then block 628 sets the poll time p to the remind time t and processing continues back to block 604.

If decision block 626 determines a reminder was not requested, then processing continues to decision block 630. If at decision block 630 it is determined that the user selected to abort the refresh, then processing continues back to block 604. If at decision block 630 the action was not to abort, then processing continues to decision block 632.

If at decision block 632 it is determined that the user selected to perform the refresh and terminate the prompt thread, then decision block 632 sets a flag for later termination of the prompt thread and continues to decision block 634. Otherwise, processing continues to decision block 636.

If at decision block 636, the user selected to perform the refresh and keep the prompt thread active, then processing continues to decision block 634. If decision block 636 determines prompting was not selected, then processing continues back to block 624.

If applicable objects (i.e. object(s) to be updated) of the target object specification are currently accessed by one or more processes (or users), as determined at decision block 634, then an error is provided at block 638 to the same prompt means given at block 622, and processing continues back to block 624. The set parameter (/S) is used to determine what the applicable objects are.

If at block 634, all target objects are available for overwrite, then block 640 copies all source objects with a later date/time stamp to corresponding target object locations and processing continues to decision block 642.

If as determined by decision block 642 the set parameter (/S) was specified with the Refresh Table configuration, then all remaining source objects not copied at block 640 are copied to their corresponding target object locations at block 644 and processing continues to decision block 646. Also, if block 642 determines a set parameter was not specified, then processing continues therefrom to block 646.

If at decision block 646, the flag for indication of prompt thread termination was not set by the previous execution of decision block 632 in continue to decision block 634, then processing continues back to block 604. If block 646 determines that the flag is set, then prompt thread processing terminates at block 648.

Processing of FIGS. 3, 4, and 5 is preferably integrated tightly within a particular operating system of a data processing system 100. Alternative embodiments will couple the FIGS. 3, 4, and 5 processing by providing interfaces for invocation by a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method of automatic refresh of objects in a data processing system, comprising the steps of:
   determining an ordered set of target objects in a target object specification;
   determining an ordered set of source objects in a source object specification, said ordered set of source objects corresponding by order to said ordered set of target objects;
   comparing values of identical attributes of an accessed target object of said ordered set of target objects with a corresponding source object of said ordered set of source objects
   assessing a difference in said values of identical attributes;
   performing a conditional refresh to the location of said accessed target object with said corresponding source object in accordance to said difference;
   parsing and deciphering configurations of said data processing system;
   building a refresh table in system memory that is semantically equivalent to said configurations; and
   associating parameters specified with said configurations to said target object specification and said source object specification in said refresh table.

2. The method of claim 1 wherein the step of performing a conditional refresh to the location of said accessed target object with said corresponding source object in accordance to said difference, comprises the steps of:
   determining said accessed target object associated to a system trap;
   incrementing a trap count for said accessed target object;
   determining if said trap count exceeds a trap tolerance configured with said parameters; and
   performing a refresh of said accessed target object with said corresponding source object in accordance with said trap count in relation to said trap tolerance.

3. A method of automatic refresh of objects in a data processing system, comprising the steps of:
   determining an ordered set of target objects in a target object specification;
   determining an ordered set of source objects in a source object specification, said ordered set of source objects corresponding by order to said ordered set of target objects;
   comparing values of identical attributes of an accessed target object of said ordered set of target objects with a corresponding source object of said ordered set of source objects, wherein said identical attributes comprises trap attributes of said accessed target object and said corresponding source object;
   assessing a difference in said values of identical attributes; and
   performing a conditional refresh to the location of said accessed target object with said corresponding source object in accordance to said difference.

4. The method of claim 3 wherein said identical attributes comprises date/time stamps of said accessed target object and said corresponding source object.

5. The method of claim 3 wherein the step of performing a conditional refresh to the location of said accessed target object with said corresponding source object in accordance to said difference, comprises the step of automatically copying any subset of source objects from said ordered set of source objects to the locations of corresponding target objects from said ordered set of target objects.

6. The method of claim 3 wherein the step of performing a conditional refresh to the location of said accessed target object with said corresponding source object in accordance to said difference, comprises the step of automatically performing a refresh before the first access of said accessed target object, or after the last release from access of said accessed target object.

7. The method of claim 3 wherein the step of performing a conditional refresh to the location of said accessed target object with said corresponding source object in accordance to said difference, comprises the steps of:
   presenting an asynchronous prompt to a user of said data processing system, said prompt indicating information describing a pending refresh;
   accepting a user action from said user prompt; and
   performing a conditional refresh of said accessed target object with said corresponding source object in accordance with said user action.

8. The method of claim 3 wherein said accessed target object is one of either locally located, or remotely located, to said data processing system.

9. The method of claim 3 wherein said corresponding source object is one of either locally located, or remotely located, to said data processing system.

10. A method of automatic refresh of objects in a data processing system, comprising the steps of:
    determining an ordered set of target objects in a target object specification;
    determining an ordered set of source objects in a source object specification, said ordered set of source objects corresponding by order to said ordered set of target objects;
    determining an unconditional refresh of at least one accessed target object of said ordered set of target objects with a corresponding source object of said ordered set of source objects; and
    performing a refresh to the location of said accessed target object with said corresponding source object.

11. A data processing system for automatic refresh of objects, said data processing system comprising:
    means for determining an ordered set of target objects in a target object specification,
    means for determining an ordered set of source objects in a source object specification, said ordered set of source objects corresponding by order to said ordered set of target objects;
    means for comparing values of identical attributes of an accessed target object of said ordered set of target objects with a corresponding source object of said ordered set of source objects, and assessing a difference in said values of identical attributes;
    means for performing a conditional refresh to the location of said accessed target object with said corresponding source object in accordance to said difference;
    means for parsing and deciphering configurations of said data processing system;
    means for building a refresh table in system memory that is semantically equivalent to said configurations; and
    means for associating parameters specified with said configurations to said target object specification and said source object specification in said refresh table.

12. The system of claim 11 wherein said means for performing a conditional refresh to the location of said accessed target object with said corresponding source object in accordance to said difference, comprises:

means for determining said accessed target object associated to a system trap;

means for incrementing a trap count for said accessed target object;

means for determining if said trap count exceeds a trap tolerance configured with said parameters; and means for performing a refresh of said accessed target object with said corresponding source object in accordance with said trap count in relation to said trap tolerance.

13. A data processing system for automatic refresh of objects, said data processing system comprising:

means for determining an ordered set of target objects in a target object specification;

means for determining an ordered set of source objects in a source object specification, said ordered set of source objects corresponding by order to said ordered set of target objects;

means for comparing values of identical attributes of an accessed target object of said ordered set of target objects with a corresponding source object of said ordered set of source objects and assessing a difference in said values of identical attributes, wherein said identical attributes comprises trap attributes of said accessed target object and said corresponding source object; and means for performing a conditional refresh to the location of said accessed target object with said corresponding source object in accordance to said difference.

14. The system of claim 13 wherein said identical attributes comprises date/time stamps of said accessed target object and said corresponding source object.

15. The system of claim 13 wherein said means for performing a conditional refresh to the location of said accessed target object with said corresponding source object in accordance to said difference, comprises means for automatically copying any subset of source objects from said ordered set of source objects to the locations of corresponding target objects from said ordered set of target objects.

16. The system of claim 13 wherein said means for performing a conditional refresh to the location of said accessed target object with said corresponding source object in accordance to said difference, comprises means for automatically performing a refresh before the first access of said accessed target object, or after the last release from access of said accessed target object.

17. The system of claim 13 wherein said means for performing a conditional refresh to the location of said accessed target object with said corresponding source object in accordance to said difference, comprises:

means for presenting an asynchronous prompt to a user of said data processing system, said prompt indicating information describing a pending refresh;

means for accepting a user action from said user prompt; and means for performing a conditional refresh of said accessed target object with said corresponding source object in accordance with said user action.

18. The system of claim 13 wherein said accessed target object is one of either locally located, or remotely located, to said data processing system, and wherein said corresponding source object is one of either locally located, or remotely located, to said data processing system.

* * * * *